US012803231B2

(12) United States Patent
Schmid

(10) Patent No.: US 12,803,231 B2
(45) Date of Patent: Nov. 17, 2026

(54) MULTIPART PLUG COMPONENT, AND ASSEMBLY AND MOTOR VEHICLE HAVING SAME

(71) Applicant: Bayerische Motoren Werke Aktiengesellschaft, Munich (DE)

(72) Inventor: Ludwig Schmid, Buch am Buchrain (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 323 days.

(21) Appl. No.: 18/442,353

(22) Filed: Feb. 15, 2024

(65) Prior Publication Data

US 2024/0283200 A1 Aug. 22, 2024

(30) Foreign Application Priority Data

Feb. 21, 2023 (DE) ..................... 10 2023 104 242.4

(51) Int. Cl.
*H01R 13/74* (2006.01)
*H01R 13/52* (2006.01)
*H01R 13/6591* (2011.01)

(52) U.S. Cl.
CPC ....... *H01R 13/748* (2013.01); *H01R 13/5202* (2013.01); *H01R 13/6591* (2013.01); *H01R 2201/26* (2013.01)

(58) Field of Classification Search
CPC .......................... H01R 13/748; H01R 13/5202
See application file for complete search history.

(56) References Cited

U.S. PATENT DOCUMENTS

2013/0323954 A1* 12/2013 Eckel ................. H01R 13/5219 439/271
2022/0399673 A1* 12/2022 Luellich ................. H01R 12/57

FOREIGN PATENT DOCUMENTS

DE 10 2011 004 347 A1 8/2012
DE 10 2018 104 536 A1 8/2019
DE 10 2021 115 009 A1 12/2022
EP 3 940 927 A1 1/2022

OTHER PUBLICATIONS

German-language Search Report issued in German Application No. 10 2023 104 424.4 dated Nov. 16, 2023 with partial English translation (10 pages).

* cited by examiner

*Primary Examiner* — Neil Abrams
(74) *Attorney, Agent, or Firm* — Crowell & Moring LLP

(57) ABSTRACT

A plug component for arrangement on a housing has an inner part with a receiving region and a fastening region which are able to be plugged simultaneously through a first aperture and a second aperture in a wall of the housing. The plug component also has an outer part for plugging onto the receiving region of the inner part. The outer part and the fastening region in this case have mutually corresponding fastening features for fastening the outer part and the fastening region together.

11 Claims, 1 Drawing Sheet

MULTIPART PLUG COMPONENT, AND ASSEMBLY AND MOTOR VEHICLE HAVING SAME

CROSS REFERENCE TO RELATED APPLICATION

This application claims priority under 35 U.S.C. § 119 from German Patent Application No. 10 2023 104 242.4, filed Feb. 21, 2023, the entire disclosure of which is herein expressly incorporated by reference.

BACKGROUND AND SUMMARY

The present invention relates to a plug component for arranging on a housing, and to a corresponding electrical assembly having such a housing and plug component. The invention also relates to a motor vehicle which has such an electrical assembly.

Plug components or plug connectors for electrical connections are currently used in a large number of variants and applications. In this regard, there are different requirements, for example manufacture and assembly that are as simple and efficient as possible, the ensuring of reliable electromagnetic shielding, sufficient electrical insulation even in HV (high-voltage) applications, sufficient heat dissipation and/or the like. Various approaches for meeting these requirements already exist, but there is still potential and the need for improvements.

As one approach, DE 10 2018 104 536 A1 describes a fixed part of a plug connector for establishing an electrically conductive connection through a wall of a structural component. The fixed part in that case has a pluggable contact element for making electrical contact with a mating contact element of a removable part of the plug connector. Furthermore, the fixed part has an electrically insulating heat transfer region which connects a base plate of the fixed part to the contact element in a thermally conductive manner.

As a further approach, DE 10 2011 004 347 A1 describes an electrical connector for producing a plug connection with a mating connector, and a corresponding plug system. In that case, the connector has a housing, a seal arranged thereon and a seal holder that is likewise arranged on the housing and is assigned to the seal. The seal holder is in that case arranged movably on the housing in order to be moved in the direction of the seal and pressed against the seal during the production of the plug connection.

The problem addressed by the present invention is to allow particularly simple and low-complexity manufacture and assembly of an electrical assembly having a housing and an electrical plug connection arranged thereon.

This problem is solved by the subject matter of the main and additional independent claims. Further possible configurations of the invention are disclosed in the dependent claims, the description and the figures. Features, advantages and possible configurations that are presented as part of the description for one part of the subject matter of the independent claims should be considered, at least analogously, to be features, advantages and possible configurations of the respective subject matter of the other independent claims and of every possible combination of the subject matter of the independent claims, optionally in conjunction with one or more of the dependent claims.

The plug component according to the invention is intended, i.e. designed, to be arranged on a housing. The plug component may thus be, for example, a built-in plug, but in particular a plug socket. The plug component may be configured, or used particularly beneficially, in particular for installation in an electrical assembly, with a plurality of parts or components with separate housings. Such an electrical assembly may be for example an electrical energy storage system, for instance for a battery-powered motor vehicle or the like. Therein, the housing may be for example a housing for power electronics, and the assembly may comprise a battery, in particular a secondary battery, having a separate battery housing, wherein an electrical connection of the battery to the power electronics may be realized via the plug component according to the invention. However, a large number of other applications of the present invention are also possible.

The plug component according to the invention has a connecting end at which, to produce an electrical connection, a corresponding plug element is able to be plugged onto the plug component according to the invention in an intended plugging direction. When the plug component according to the invention is for example a plug socket, the corresponding plug element may be a corresponding plug. Likewise, the plug component according to the invention may in principle be a built-in plug and the corresponding plug element may be a corresponding coupling. Depending on the configuration, the corresponding plug element may thus be plugged into or onto the plug component according to the invention, or the like, in order to establish the electrical connection. Furthermore, the plug component has a connection end opposite the connecting end in the plugging direction, and an inner part and an outer part. The connecting end and the connection end may in this case generally or sweepingly denote the end regions or outer sides of the plug element that are opposite one another in the plugging direction. The inner part and the outer part may be separately prefabricated components that are connected together in the intended installation position or in the finally assembled state of the plug component. The inner part and the outer part may, for example, each be manufactured at least partially from an electrically insulating plastics material, for example as injection-molded parts or the like.

According to the invention, the inner part has a receiving region with electrical contact elements received or arranged therein, and at least one fastening region. The electrical contact elements may be electrical connections, which may be configured for example as contact openings or contact bars or the like. The contact elements may thus be manufactured in particular from a metallic or electrically conductive material. In this case, the contact elements may be understood to be parts of the inner part or to be separate components. The receiving region and the fastening region are connected together at the connection end or designed to transition into one another there. By contrast, in a region or portion located between the connection end and the connecting end, the receiving region and the fastening region are spaced apart from one another perpendicularly to the plugging direction, that is to say in a corresponding transverse direction perpendicular to the plugging direction. In other words, the receiving region may thus directly surround for example a central longitudinal center axis, extending in the plugging direction, of the inner part, while the at least one fastening region is spaced apart farther from the longitudinal center axis in the transverse direction, i.e. for example in a radial direction, wherein, along this transverse direction, there is a gap or a spacing between the receiving region and the fastening region. For example, the receiving region and the fastening region may project away, in different positions, from an end region of the inner part at the connection end in the plugging direction toward the connecting end. In this case, the receiving region and the fastening region may extend parallel to one another or longitudinally.

As a result of the presently provided configuration, the receiving region is able to be plugged through a first aperture in a wall of the housing and, at the same time, the at least one fastening region is able to be plugged through a respective adjacent second aperture in the wall of the housing. The inner part can thus be inserted in particular into an interior of the housing and be plugged from there through the apertures in the housing wall, such that the inner part can then project partially out of the housing. The inner part can then be prevented from sliding entirely through the housing wall by the connection, then existing in the housing interior, of the receiving region and the fastening region, i.e. the end region at the connection end of the inner part. Thus, in the intended installation position, this connection can cover, in the housing interior, a part, extending between the apertures provided for the receiving region and the fastening region, or web, of the housing wall. By contrast, sides or ends of the receiving region and of the fastening region facing the connecting end of the inner part can project out of the housing in the plugging direction through the housing wall or the corresponding housing apertures in the housing wall.

The inner part including the receiving region, the at least one fastening region and the connection thereof may in this case be configured in particular in one piece or integrally. Although this is not absolutely necessary, it may optionally allow particularly simple and cost-effective manufacture and assembly of the plug component and the occurrence of creepage paths or leaks between corresponding individual parts of the inner part may be avoided.

According to the invention, the outer part is designed to be plugged onto the receiving region of the inner part at the connecting end in the plugging direction, i.e. as seen from the connecting end toward the connection end, such that it then, i.e. in the position plugged onto the receiving region, surrounds the receiving region perpendicularly to the plugging direction and, as seen in the plugging direction, at least partially covers the fastening region. The outer part may thus have a central cutout that passes entirely through the outer part in the plugging direction and can receive a connecting-end-side part of the receiving region, or receives it in an intended installation position.

According to the invention, the outer part and the fastening region of the inner part have mutually corresponding fastening features for fastening the outer part to the fastening region or for fastening the outer part and the fastening region together. Such fastening features may be or comprise for example screw holes, mutually engaging parts of a latching or clip connection and/or the like.

If, for example, the inner part is already assembled on the housing such that it passes through the housing wall thereof, the outer part can be plugged onto the receiving region entirely from outside the housing and be fastened to the fastening region. In this intended installation or assembly position of the inner part and outer part, i.e. of the entire plug component, a part of the housing wall can then be located between the inner part and the outer part. As a result of the outer part being fastened to the fastening region, i.e. to the inner part, it is thus possible for both the inner part and the outer part to be fixed relative to the respectively other part of the plug component and, in the intended installation position, also relative to the housing wall, in particular also in the plugging direction. Thus, the plug component assembled in this way can then form or provide a stable and positionally fixed connection possibility for the corresponding plug element.

It should be noted here that the inner part and the outer part are both parts of a single plug component, i.e. for example of a plug socket. Thus, the inner part and the outer part should not in this case be considered to be for instance the two parts of a complete plug connection, i.e. for example a socket and a corresponding plug.

The configuration according to the invention of the plug component may, as indicated above, allow preassembly of the inner part on the housing with final internal electrical contact between the contact elements of the plug component and final sealing of the housing from the environment thereof. This sealing of the housing does not then need to be undone to fit the outer part of the plug component in a subsequent manufacturing or assembly step and then to be reestablished and checked. Thus, to fit the outer part, it is then no longer necessary to have access to the housing interior for the contacting of components that are electrically connected to the inner part in the housing. Thus, overall, simpler, quicker, more cost-effective and more reliable assembly or manufacture can be allowed than when conventional solutions are used. Likewise, as a result of the present invention, comparatively simplified and more efficient logistics can be allowed, for example when the manufacture of the housing with components arranged therein and the integrated inner part of the plug component according to the invention, for the one part, and final assembly of assembly comprising this housing and the outer part of the plug component, for the other part, take place at different locations. Advantageously, it is additionally possible for the inner part, when it is fitted on the housing, to be centered or oriented automatically in the spatial directions defining the housing wall as a result of it being plugged through the apertures in the housing wall. In the process, the inner part may initially remain movable perpendicularly thereto, i.e. in the plugging direction. This may allow particularly simple tolerance compensation during the final assembly or subsequent assembly of the outer part. In addition, the configuration according to the invention of the plug component may allow a particularly simple and low-complexity realization or integration of EMC (electromagnetic compatibility) shielding in spite of tolerances in particular in the plugging direction during assembly. This will be discussed in more detail elsewhere.

In one possible configuration of the present invention, the mutually corresponding fastening features of the outer part and of the fastening region are configured as screw holes that extend longitudinally in the plugging direction. In other words, the outer part can thus be screwed together with or to the fastening region. In this case, at least the at least one screw hole in the fastening part—or the at least one screw hole in the outer part—may have a thread. The screw hole in the fastening part may be configured in particular as a blind hole, while the screw hole in the outer part may be configured in particular as a through-hole. The fastening feature of the outer part may be arranged for example in a collar or flange region of the outer part, which may entirely surround for example a shank region. This shank region may bear against the inner part or extend parallel thereto. The presently proposed configuration of the fastening features as screw holes, i.e. the fastening of the outer part to the fastening region by means of screwing, may involve several useful properties. Thus, as a result of the screwing, both the outer part and the inner part can be drawn together and/or against the housing with a predefined force. In the process, positional tolerances, that is to say different positions in particular of the inner part relative to the housing, as may exist before the outer part is fastened, can be readily compensated, such that ultimately a predefined position can be achieved. In addition, such screwing may be reversible particularly easily and nondestructively. As a result, particularly simple and good maintainability and repairability can be achieved.

In a further possible configuration of the present invention, the inner part has, at least on an outer side of the receiving region, an EMC shielding element, i.e. shielding against electromagnetic fields or radiation. This EMC shielding element in this case also extends between the receiving region and the fastening region. The EMC shielding element may thus extend for example in the plugging direction as far as the connection-end-side connection of the receiving region and the fastening region. The outer side of the inner part may, in the intended installation position, be that side or face of the receiving region of the inner part that faces a corresponding inner side of the outer part. When the outer part is in a position plugged onto the receiving region, the outer part, or the inner side thereof, may thus bear against a connecting-end-side part of the EMC shielding element. The EMC shielding element may then thus be located partially also between the receiving region of the inner part and the outer part, but extend from there in the plugging direction toward the connection end beyond the outer part. The EMC shielding element may be or comprise in particular a metallic element, for example a metal sheet or a metal foil or a metallic fabric, or be or comprise a metallic coating or the like. In the intended installation position, as a result of the presently proposed arrangement of the EMC shielding element, this EMC shielding element can bear directly on the housing or come into contact therewith. As a result, integrated continuous, i.e. interruption-free EMC shielding in the region of the plug component can be realized particularly easily and effectively. In this case, it is also possible to realize tolerance compensation in a particularly simple and reliable manner, as is explained in more detail elsewhere.

In one possible development of the present invention, the EMC shielding element has, at its end facing the connection end, at least one spring contact for bearing resiliently against the wall of the housing. In particular, this at least one spring contact may, in the intended installation position of the plug component, bear against an inner side, facing the housing interior, of that part or web of the housing wall that extends between the apertures for the receiving region and the fastening region. As a result of such a spring contact, it is possible, in spite of positional tolerances, existing in particular in the plugging direction, to achieve or ensure direct contact between the EMC shielding element and the housing in a particularly reliable manner. Moreover, such a spring contact can serve for tolerance compensation in the plugging direction, in particular with regard to the position of the inner part relative to the housing. Thus, particularly simple, reliable and robust manufacture and assembly of the plug component according to the invention can be allowed.

In a further possible development of the present invention, the plug component has a seal between the outer part and the fastening region. This seal may also be referred to as first seal or inner seal here. This inner seal may surround in particular a transitional or contact region of the fastening features of the outer part and of the fastening region. As a result, this inner seal may provide sealing for example against ingress of water, dirt or oil or the like through the fastening feature or along the fastening feature of the outer part. This inner seal can be retained readily by the outer part being fastened to the fastening region. Such a seal can contribute to improved robustness, reliability and durability both of the plug component and of the assembly equipped therewith.

In a further possible configuration of the present invention, the outer part has at least one further fastening feature for fastening the outer part to a component that is not part of the plug component itself. This external component may be the wall of the housing, but in particular differ therefrom. For example, the abovementioned housing may be a housing for power electronics and the external component mentioned here may be a part of a battery housing of a battery from which the power electronics can be fed or supplied during operation as intended. The further fastening feature may, for example, likewise be or comprise a screw hole. The latter may extend, in particular as a through-hole, in the plugging direction through the outer part, for example likewise in the collar or flange part, mentioned elsewhere, of the outer part or the like. Thus, it may then extend in particular parallel to the at least one screw hole for fastening the outer part to the fastening region, or longitudinally. The presently proposed further fastening feature may allow particularly reliable and robust fastening of the plug component. Likewise, it is possible as a result for the plug component itself to act as a connection between two other components—for example the housings of the power electronics and the battery—and thus be multifunctional.

In one possible development of the present invention, the further fastening feature is arranged on the outside of the fastening feature for fastening the outer part to the fastening region. The further fastening feature may thus be arranged in particular on one of the contact elements, or the longitudinal center axis, mentioned elsewhere and extending in the plugging direction, of the inner part, or the side, facing away from the receiving region, of the fastening feature for fastening the outer part to the fastening region. To distinguish it better, the latter fastening feature may also be referred to as first or inner fastening feature, while the presently proposed further fastening feature may also be referred to as second or outer fastening feature. The presently proposed arrangement of the further fastening feature may allow a particularly simple configuration and assembly of the plug component.

In one possible development of the present invention, the plug component has a seal on a side of the outer part facing the connection end. To distinguish it better from the first or inner seal mentioned elsewhere, this seal may also be referred to as second or outer seal. This second or outer seal may, in a first variant, be arranged between the fastening feature and the further fastening feature in a transverse direction extending perpendicularly to the plugging direction. In the example mentioned elsewhere, this second or outer seal may be arranged, in the intended installation position of the plug component, for example between the outer part and the battery housing. Thus, the second or outer seal may likewise serve for tolerance compensation in a correspondingly complex fastening situation of the plug component. The second or outer seal may provide or allow particularly robust and reliable protection against external environmental influences. As a result of the arrangement of the second or outer seal on the inside of the further fastening feature, the latter may then not need to be additionally sealed off itself. As a result, a particularly simple configuration of the plug component to achieve a particular robustness or a particular sealing requirement may ultimately be allowed.

In a second variant, the second or outer seal is arranged in the transverse direction on the side of the fastening features facing away from the receiving region, that is to say, with regard to the receiving region or the longitudinal center axis of the plug component, on the outside of or radially outside the fastening features. In this case, an additional seal is arranged on the fastening feature located farther away from the receiving region in the transverse direction, that is to say the outer or further fastening feature. This additional seal may also be referred to as third seal or fastening seal. In particular, the additional seal may be arranged on a side of the outer part facing the connecting end. As a result of this additional seal, the predefined robustness or sealing requirement can be achieved or fulfilled in spite of the arrangement of the further fastening feature on the inside of the second or outer seal. The third seal may, in this case, be arranged for example on a screw head of a screw passed, in the intended installation position, through the further fastening feature that is then embodied as a screw hole. In this way, ingress for example of water, dirt or oil or the like along the further fastening feature can be avoided or reduced.

The present invention also relates to an electrical assembly which has a housing and at least one plug component according to the invention, wherein the plug component is arranged so as to pass through a wall of the housing. The electrical assembly according to the invention may be in particular the assembly mentioned in conjunction with the plug component according to the invention, or correspond thereto. The assembly according to the invention may thus comprise for example the plug component, the power electronics and the battery including the housing thereof. Other configurations or applications are likewise possible, however.

The present invention also relates to a motor vehicle which has the electrical assembly according to the invention.

Further features of the invention will become apparent from the claims, the figures and the description of the figures. The features and combinations of features mentioned previously in the description and the features and combinations of features shown below in the description of the figures and/or only in the figures are usable not only in the combination specified in each case but also in other combinations or on their own, without departing from the scope of the invention.

BRIEF DESCRIPTION OF THE DRAWINGS

In the figures, identical and functionally identical elements are provided with the same reference signs.

DETAILED DESCRIPTION OF THE DRAWINGS

Figure 1:
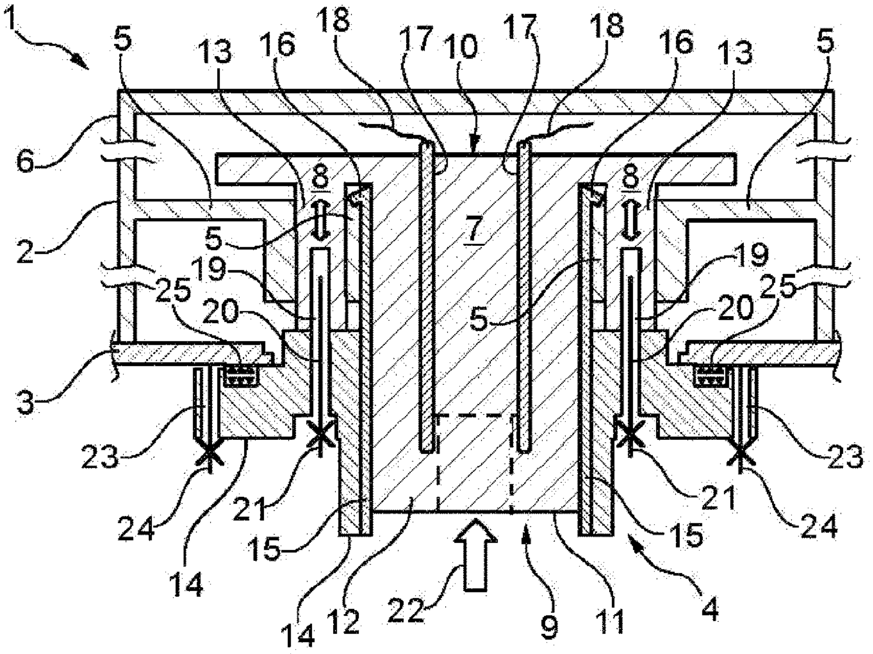
FIG. 1 is a partial schematic illustration of an electrical assembly of a motor vehicle having a multipart plug socket in a first variant.

FIG. 1 shows a partial schematic cross-sectional view of an electronic assembly 1. This assembly 1 in this case comprises for example power electronics having an electronic housing 2 and a battery, for example a high-voltage or traction battery for a motor vehicle or the like, having a battery housing 3. Furthermore, the assembly 1 in this case comprises a plug socket 4 which is fastened to the electronic housing 2. In addition, the plug socket 4 is in this case also fastened to the battery housing 3. The plug socket 4 may provide a connection point, accessible from outside the electronic housing 2, in this case in particular a high-voltage connection, for electrical and/or electronic, in particular power-electronic, components arranged in the electronic housing 2. Via the plug socket 4 it is thus possible for example for external electrical consumers, for instance an electric drive or the like, to be connected or supplied.

In conventional plug components on corresponding electronics, mechanical attachment of electromagnetic shielding may be problematic, for example, on account of vertical tolerances. Likewise, conventionally, during installation or for contact establishment with the respective plug component, the electronic housing 2 often has to be upwardly open or opened. This may require additional hand movements or assembly steps, an additional sealing test and thus additional effort overall. These problems can be avoided by the configuration and arrangement of the plug socket 4 illustrated here.

In this case, the electronic housing 2 has a housing wall 5 on one side, for example on an underside. On another side, for example opposite the housing wall 5, the electronic housing 2 has a housing cover 6. Formed in the housing wall 5 in this case are a plurality of cutouts or apertures, specifically a central main aperture 7 and at least one secondary aperture 8 located next to the latter. In this case, the main aperture 7 may be surrounded annularly by the secondary aperture 8 or a plurality of individual secondary apertures 8 may be formed at various points, in this case for example on both sides of the main aperture 7 in the illustrated cross-sectional plane. The main aperture 7 and the secondary apertures 8 pass through the housing wall 5 perpendicularly to the main plane of extension thereof, which may in this case be perpendicular to the drawing plane.

The plug socket 4 has been inserted into these apertures 7, 8 such that a connecting end 9 of the plug socket 4 (for a corresponding plug, for example, not shown) is located outside the electronic housing 2 and a connection end 10 of the plug socket 4 is located in the housing interior of the electronic housing 2.

The plug socket 4 is in this case of multipart design and comprises an inner part 11 with a receiving region 12 (configured to receive a plug, for example, indicated only schematically via dashed lines) and at least one fastening region 13 arranged next to the latter, and an outer part 14. The receiving region 12 and the fastening region 13 or fastening regions 13 are in this case connected together at the connection end 10. As a result, the inner part 11 cannot slide entirely through the apertures 7, 8 and out of the electronic housing 2. The receiving region 12 is in this case surrounded, for electromagnetic shielding, by an EMC shielding element 15. The EMC shielding element 15 in this case has, at its end facing the connection end 10, at least one mechanical spring contact 16. Thus, the EMC shielding element 15 comes into contact with a side of the housing wall 5 facing the housing interior of the electronic housing 2. It is thus possible for electrical contact elements 17 of the plug socket 4 that are arranged in the receiving region 12 to be electrically shielded by the EMC shielding element 15. The contact elements 17 may be contacted in the housing interior of the electronic housing 2 by electrical connection lines 18 which may extend onward to electrical and/or electronic components that are arranged in the electronic housing 2 and are not illustrated specifically here.

To assemble the assembly 1 illustrated here, first of all, with the electronic housing 2 open, the inner part 11 can be inserted into the apertures 7, 8. The electronic housing 2 can then be equipped with the electrical and/or electronic components provided depending on the application, and these can be electrically connected to the contact element 17 via the connection lines 18. Subsequently, the housing cover 6 can be attached and thus the electronic housing 2 closed off and finally sealed off. The electronic housing 2 prefabricated in this way with the inner part 11 can then be handled particularly easily as a unit or transported for example to a final assembly point. The electronic housing 2 prefabricated in this way can then for example be placed or fitted on the battery housing 3 and the outer part 14 plugged onto the part projecting out of the electronic housing 2, i.e. the connection end 10 of the inner part 11. In the process, respective fastening features of the inner part 11 and of the outer part 14 can be brought into congruence with one another. In the present case, the inner part 11 has respective blind holes 19 as such fastening features in the fastening regions 13. As corresponding fastening features, the outer part 14 has through-holes 20. There, the outer part 14 has been screwed onto the fastening regions 13 by means of fastening screws 21.

For further illustration, a plugging direction 22 is indicated here, in which the outer part 14 can be plugged onto the inner part 11 and the fastening screws 21 can be screwed in.

In addition to the through-holes 20 for fastening the outer part 14 to the fastening regions 13, the outer part 14 has further fastening features, in this case for example in the form of a plurality of housing fastening holes 23. Housing screws 24 have been passed through these housing fastening screws 23, these housing screws additionally fastening the outer part 14—in this case for example to the battery housing 3.

During the fastening of the outer part 14 by means of the housing screws 24 or of the fastening screws 21, an outer seal 25 arranged in this case between the outer part 14 and the battery housing 3 is compressed. This serves for tolerance compensation and for the establishment of a seal with respect to the environment.

Figure 2:
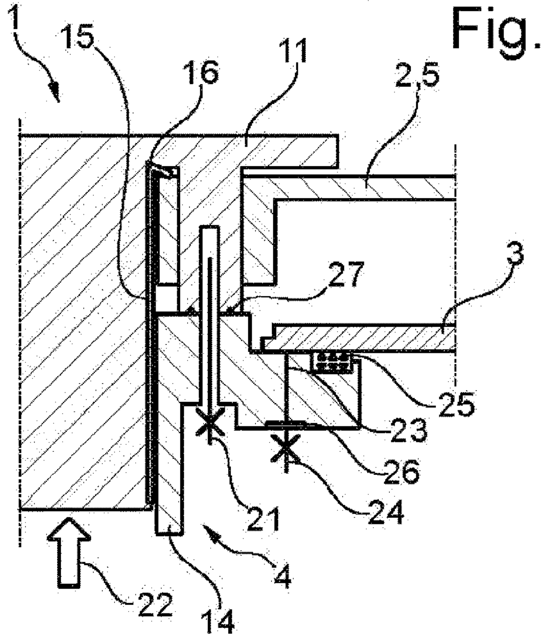
FIG. 2 is a partial schematic illustration of the assembly having the plug socket in a second variant.

FIG. 2 shows a partial schematic illustration of the assembly 1 in a different variant. In this case, the outer seal 25 is arranged on the outside of the screws 21 and 24, that is to say, as seen in transverse direction extending perpendicularly to the plugging direction 22, at a greater distance from the receiving region 12 than in the variant illustrated in FIG. 1. In order, in this case, to avoid ingress for example of moisture or dirt at the housing screws 24 through the housing fastening holes 23, a fastening seal 26 is arranged at an end facing away from the battery housing 3 or at an end, facing the connecting end 9, of the housing fastening holes 23.

Furthermore, here too, at least one inner seal 27 is illustrated, which is arranged between the outer part 14 and the inner part 11 in each case around the fastening screws 21. This inner seal 27 can likewise be used for example in the variant of the assembly 1 that is illustrated in FIG. 1.

Figure 3:
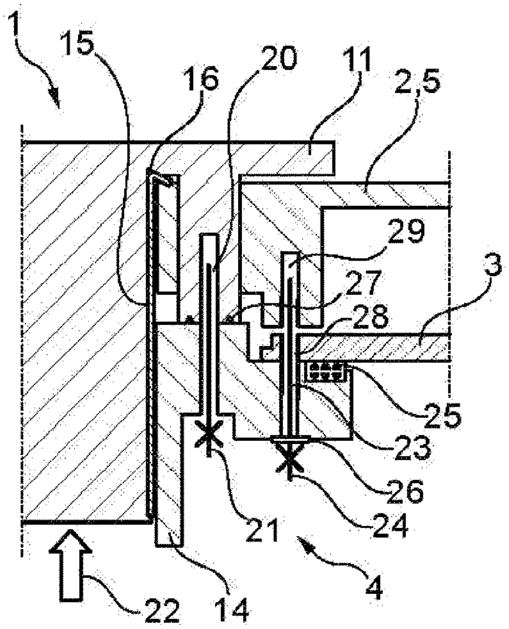
FIG. 3 is a partial schematic illustration of the assembly having the plug socket in a third variant.

FIG. 3 shows the assembly 1 in a further variant. In this case, the battery housing 3 has first housing fastening features 28 and the electronic housing 2 has, in particular on the housing wall 5 thereof, second housing fastening features 29. In the present case, the housing screws 24 have thus been passed through the battery housing 3 and screwed into the electronic housing 2. Thus, the combination of the inner part 11 and outer part 14 is clamped against the electronic housing 2 by means of the fastening screws 21 and housing screws 24. This can be designed with regard to tolerances such that the outer seal 25 is or remains permanently pressed together with the battery housing 3. Here too, by way of example, the fastening seals 26 and the inner seals 27 are provided.

Figure 4:
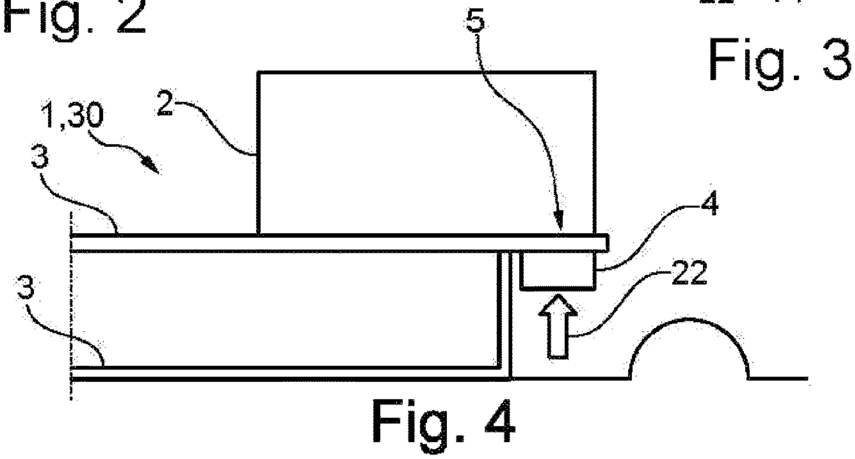
FIG. 4 is a partial schematic side illustration for further demonstrating the arrangement of the plug socket in the assembly.

FIG. 4 shows, for further illustration, a somewhat more comprehensive partial rough side illustration of a motor vehicle 30 which is equipped with the assembly 1. It is apparent here that the electronic housing 2 is arranged above the battery housing 3 and on top of the latter in the vehicle vertical direction. The plug socket 4 can in this case be arranged in a collar or flange region, protruding in the vehicle longitudinal direction, of the battery housing 3.

In the electronic housing 2, it is possible for example for components of power and/or storage electronics to be arranged. It is thus possible for current tapped from the battery housing 3, or from battery cells arranged therein, to be regulated and made available via the plug socket 4.

In summary, the inner part 11 and outer part 14 of the plug socket 4 are thus initially separate from one another here, i.e. for example separately prefabricated. Therefore, the inner part 11 can first of all be fitted on the electronic housing 2 beforehand, independently of the outer part 14, and the corresponding electronics with the pre-fitted inner part 11 supplied for example for final assembly. It is also possible for electrical connections of the electrical and/or electronic components of the electronics with the inner part 11, in particular the contact elements 17 thereof, to have already been fitted and tested beforehand during the separate manufacture of the electronics. In the process, the inner part 11 may be or may have been centered in the spatial directions perpendicular to the plugging direction 22 by the parts that project through the apertures 7, 8 counter to the plugging direction 22. At this time, the inner part 11 may still be movable at least to some extent in the plugging direction 22. For example, after the prefabricated electronic housing 2 has been fitted on the battery housing 3, the outer part 14 can be plugged in the plugging direction 22 onto the inner part 11 and screwed together with the latter. During this final assembly, the outer part 14 may also be screwed tightly to the battery housing 3. Overall, during this final assembly and fastening of the outer part 14, the inner part 11 and the outer part 14 are drawn into their final positions in the plugging direction 22, wherein tolerance compensation can take place via the inner part 11 and optionally the seals 25, 27 and also the spring contacts 16 of the EMC shielding element 15.

The described examples thus show how plug division, tolerance compensation and EMC shielding integration can be realized practicably and usefully.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Assembly
2 Electronic housing
3 Battery housing
4 Plug socket
5 Housing wall
6 Housing cover
7 Main aperture

8 Secondary aperture
9 Connecting end
10 Connection end
11 Inner part
12 Receiving region
13 Fastening region
14 Outer part
15 EMC shielding element
16 Spring contact
17 Contact element
18 Connection line
19 Blind hole
20 Through-hole
21 Fastening screw
22 Plugging direction
23 Housing fastening hole
24 Housing screw
25 Outer seal
26 Fastening seal
27 Inner seal
28 First housing fastening feature
29 Second housing fastening feature
30 Motor vehicle

What is claimed is:

1. A component to be arranged on a housing, comprising:

a plug component comprising a connecting end at which, to produce an electrical connection, a corresponding plug element is able to be plugged onto the plug component in an intended plugging direction, and a connection end opposite the connecting end in the plugging direction, wherein the plug component further comprises an inner part and an outer part, wherein the inner part has a receiving region with electrical contact elements arranged therein, and at least one fastening region, the receiving and fastening regions being connected together at the connection end and being spaced apart from one another, perpendicularly to the plugging direction, in a portion located between the connection end and the connecting end, such that the receiving region is able to be plugged through a first aperture in a wall of the housing and, at the same time, the at least one fastening region is able to be plugged through an adjacent second aperture in the wall of the housing, wherein the outer part is configured to be plugged onto the receiving region of the inner part at the connecting end in the plugging direction, such that the outer part then surrounds the receiving region perpendicularly to the plugging direction and, as viewed in the plugging direction, at least partially covers the fastening region, and wherein the outer part and the fastening region have mutually corresponding fastening features for fastening the outer part and the fastening region together.

2. The component according to claim 1, wherein the mutually corresponding fastening features of the outer part and the fastening region are configured as screw holes that extend longitudinally in the plugging direction.

3. The component according to claim 1, wherein the inner part has, at least on an outer side of the receiving region, an EMC shield which also extends between the receiving region and the fastening region.

4. The component according to claim 3, wherein the EMC shield has, at an end facing the connection end, a spring contact for bearing resiliently against the wall of the housing.

5. The component according to claim 1, wherein the plug component has a seal between the outer part and the fastening region.

6. The component according to claim 1, wherein the outer part has at least one further fastening feature for fastening the outer part to a component, other than the wall of the housing.

7. The component according to claim 6, wherein the at least one further fastening feature is arranged on an outside of the fastening feature for fastening the outer part to the fastening region.

8. The plug component according to claim 7, wherein the plug component has a seal on a side of the outer part facing the connection end, wherein this seal is:

(i) arranged between the fastening feature and the further fastening feature in a transverse direction extending perpendicularly to the plugging direction, or (ii) arranged in the transverse direction on the side of the fastening features facing away from the receiving region, and in such a case, an additional seal is arranged on the further fastening feature located farther away from the receiving region in the transverse direction, on a side of the outer part facing the connecting end.

9. An electrical assembly, comprising:

a housing; and a plug component arranged on the housing, the plug component comprising a connecting end at which, to produce an electrical connection, a corresponding plug element is able to be plugged onto the plug component in an intended plugging direction, and a connection end opposite the connecting end in the plugging direction, wherein the plug component further comprises an inner part and an outer part, wherein the inner part has a receiving region with electrical contact elements arranged therein, and at least one fastening region, the receiving and fastening regions being connected together at the connection end and being spaced apart from one another, perpendicularly to the plugging direction, in a portion located between the connection end and the connecting end, such that the receiving region is pluggable through a first aperture in a wall of the housing and, at the same time, the at least one fastening region is pluggable through an adjacent second aperture in the wall of the housing, wherein the outer part is configured to be plugged onto the receiving region of the inner part at the connecting end in the plugging direction, such that the outer part then surrounds the receiving region perpendicularly to the plugging direction and, as viewed in the plugging direction, at least partially covers the fastening region, and wherein the outer part and the fastening region have mutually corresponding fastening features for fastening the outer part and the fastening region together.

10. A motor vehicle comprising an electrical assembly according to claim 9.

11. The motor vehicle according to claim 10, further comprising a traction battery and corresponding power electronics.

* * * * *